May 6, 1958 D. L. SPANJER 2,833,360
STEERING-BY-DRIVING OF ENDLESS TRACK VEHICLE
Filed June 28, 1954 4 Sheets-Sheet 1

David L. Spanjer
By Harold T. Stowell
Attorney

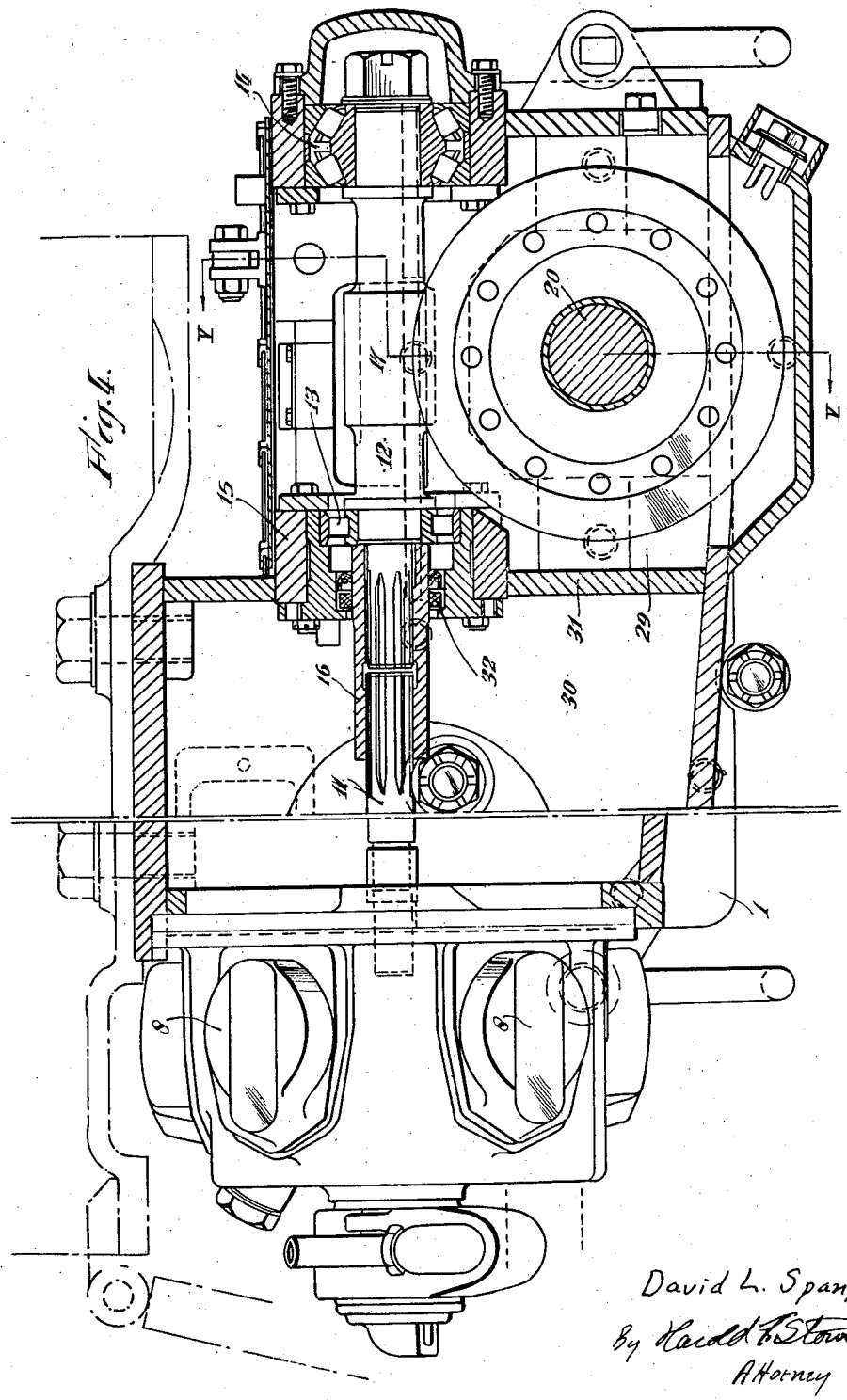

May 6, 1958   D. L. SPANJER   2,833,360
STEERING-BY-DRIVING OF ENDLESS TRACK VEHICLE
Filed June 28, 1954   4 Sheets-Sheet 3
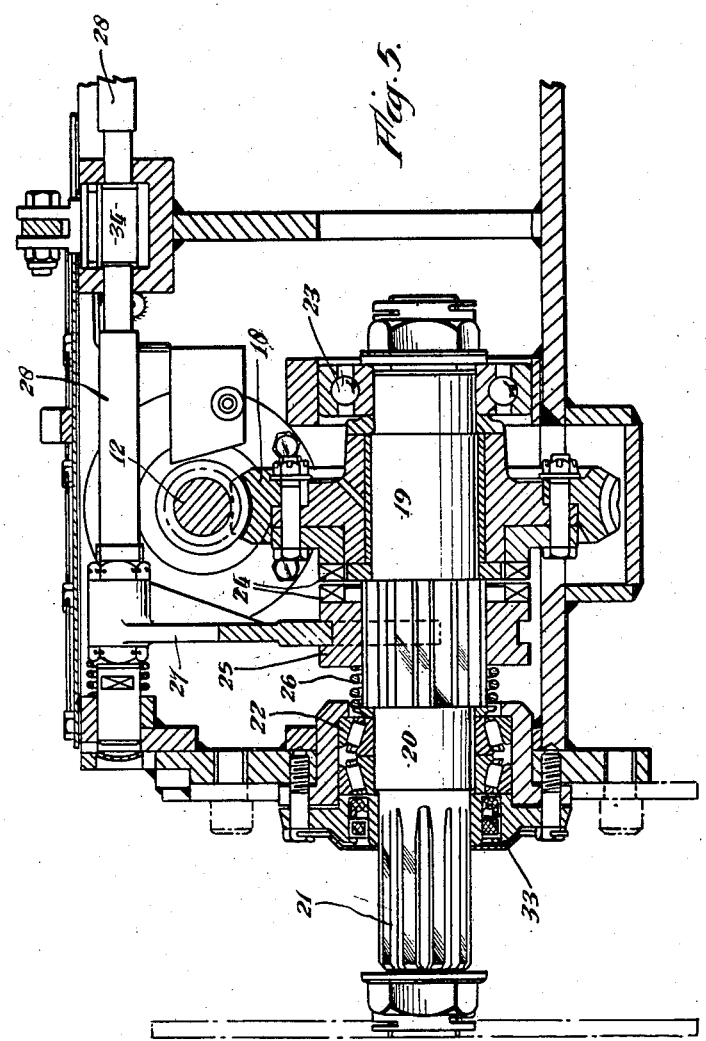
David L. Spanjer
By Harold T. Stowell
Attorney

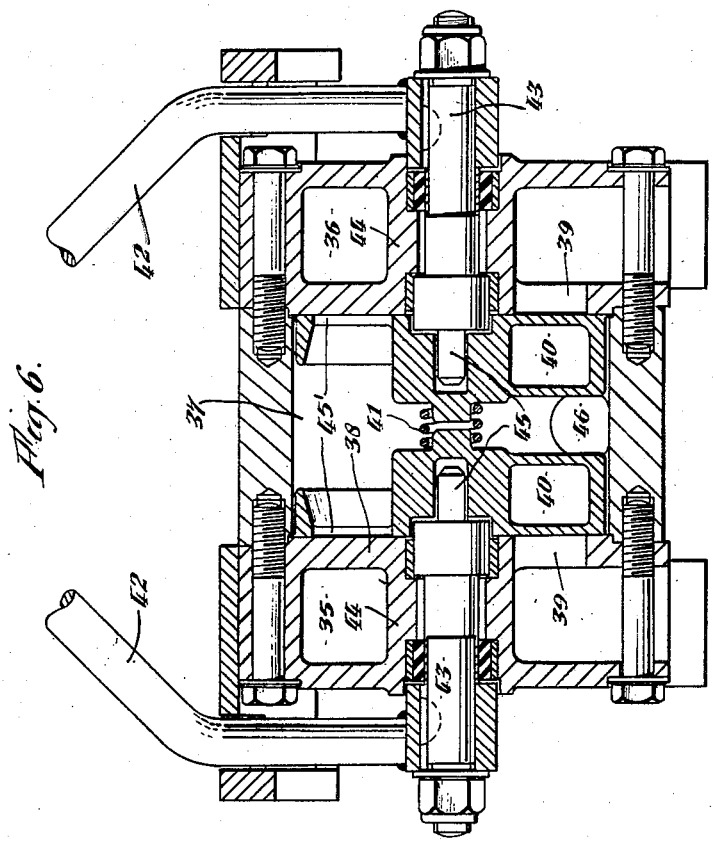

United States Patent Office 2,833,360
Patented May 6, 1958

2,833,360

STEERING-BY-DRIVING OF ENDLESS TRACK VEHICLE

David Lucien Spanjer, Leeds, England, assignor, by mesne assignments, to The Eimco Corporation, Salt Lake City, Utah, a corporation of Delaware Application June 28, 1954, Serial No. 439,771

Claims priority, application Great Britain June 26, 1953

1 Claim. (Cl. 180—6.48)

This invention relates to mobile machines of the kind having a chassis structure mounted on selectively drivable ground-engaging units whereby the machine may be maneuvered forwards and backwards and steered as required.

The invention is particularly applicable to machines for use in restricted spaces where a remote source of power, such as compressed air or electricity, is available. Thus, the invention is of particular utility in connection with machines of the overhead discharge shovel bucket type or other material-handling machines for use in mines, quarries, ship's hold, warehouses or similar locations, as well as to machines serving as mobile supports for cranes, conveyors, elevators or other apparatus, or as transport vehicles.

Mobile machines of the kind referred to usually are driven by a power unit, such as an internal combustion engine carried by the machine, and the power transmission from the power unit to the endless tracks or other ground-engaging units necessarily involves complicated gearing and clutch means whereby the said tracks or units may be selectively driven in either direction.

The present invention has for its object to provide an improved mobile machine of the kind referred to operable from a remote source of power and in which selective driving of the ground-engaging units is effected by power transmission means of comparatively simple construction and providing ease of control for operation of the machine in a confined space.

According to the present invention, in a mobile machine of the kind having a chassis structure mounted on selectively drivable ground-engaging units, power transmission means for said ground-engaging units comprises two independently operable reversible motors one for each ground-engaging unit, said motors being operable from a remote source of power and each motor driving the respective ground-engaging unit through reduction gearing, and means being provided for selectively controlling said motors.

The invention includes a mobile machine of the kind having a chassis structure mounted on selectively drivable ground-engaging units, wherein said chassis structure is of hollow formation and houses two independent power transmission means one at each side of the center line of the machine, each power transmission means including an independent reversible motor mounted at the front of said chassis structure, a power transmission shaft extending rearwardly from said motor to reduction gearing in the rear part of the structure, and a rear driving axle driven from said motor through said gearing, and control means is provided for selective operation of said motors.

The ground-engaging units preferably comprise endless track structures, but may comprise suitably coupled wheel arrangements.

A driven gear of the reduction gearing in each power transmission means may be carried by an inner end of a rear driving axle and a withdrawable endless track driving sprocket by the outer end of said axle.

A clutch may be provided in the drive between each motor and the respective ground-engaging unit, and said clutch may comprise dog clutch means for coupling a driven gear of said reduction gearing to a driving axle of the ground-engaging unit.

The reduction gearing may comprise worm and worm wheel gearing.

The invention includes a mobile machine as above defined wherein an overhead discharge shovel bucket loader device is mounted on said chassis structure.

Said motors may be compressed air motors and control means for said motors may comprise a double valve structure including two compressed air supply chambers spaced apart by a compressed air inlet chamber, each supply chamber being provided with two outlets for connection to the respective motor and having ports in an inner wall communicating with said inlet chamber under the control of valve rotor members disposed in said inlet chamber, spring means for pressing said valve rotor members into sealing engagement with seating faces of said supply chambers, a control arm for each valve rotor member disposed externally of the respective supply chamber and a shaft extending from each arm through a central boss in the respective supply chamber for operation of the respective valve rotor member. Said spring means may be disposed between the opposed valve rotor members in the said inlet chamber. An inlet of said inlet chamber may be connected to a compressed air input fitting carried by said machine.

The invention is hereinafter described, by way of example, with reference to the accompanying diagrammatic drawings, in which:

Fig. 4 is an enlarged vertical section on the line IV—IV of Fig. 3;

Fig. 5 is a vertical section on the line V—V, Fig. 4; and

Fig. 6 is a vertical cross-sectional view on an enlarged scale of the control valve shown in Fig. 1.

Figure 1:
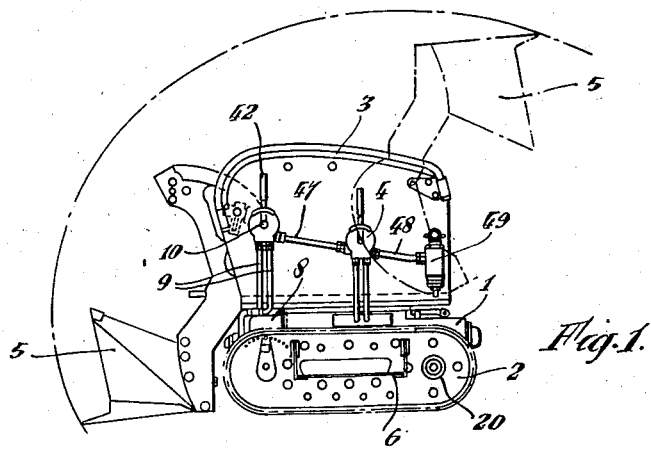
Fig. 1 is a side elevation showing a machine according to the invention provided with an overhead discharge shovel bucket loader device.
Figure 2:
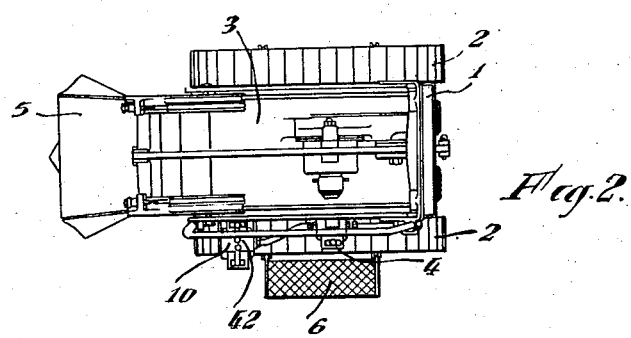
Fig. 2 is a plan view corresponding to Fig. 1.
Figure 3:
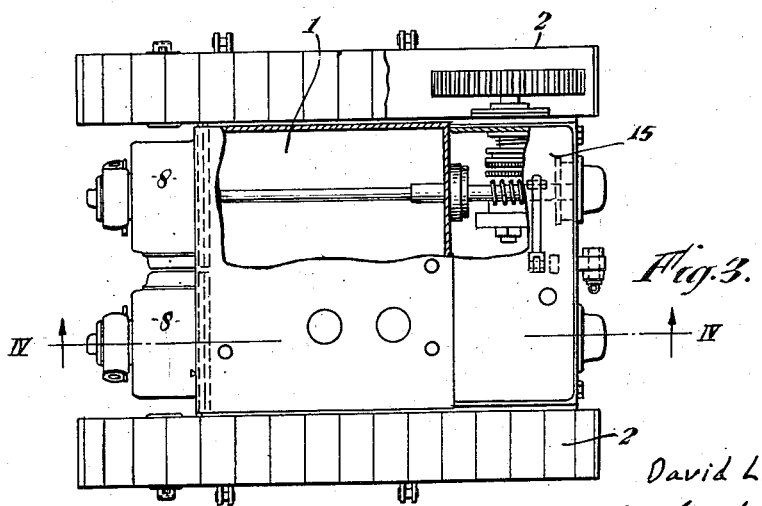
Fig. 3 is a plan view on a larger scale illustrating one embodiment of the machine according to the invention.

In carrying the invention into effect according to a particular embodiment, as shown in the drawings, the improved mobile machine comprises a chassis structure 1 supported by endless track units 2, the chassis structure 1, as shown more particularly in Figs. 3, 4 and 5, being of hollow construction for housing power transmission means. Any suitable material-handling or other apparatus may be mounted on the chassis structure 1. As shown in Figs. 1 and 2, an overhead discharge shovel bucket loader device 3 is mounted on the chassis structure 1 and is operated by compressed air under the control of a valve 4 so that a shovel bucket 5 may be moved between a material-gathering position at the front of the machine to an elevated discharge position at the rear, as indicated in broken lines. The operator for the machine stands on a laterally extending platform 6 at the side of the machine.

As shown more particularly in Figs. 3, 4 and 5, power transmission means for the machine comprises two independent units arranged one on each side of the center line of the machine, said units being selectively operable for driving the endless track units 2. Thus, as shown, two reversible compressed air motors 8 are mounted on the front of the chassis structure 1, each motor being connected by a pair of supply pipes 9 to a compressed air supply chamber of a control valve 10.

As shown in Fig. 4, each reversible motor 8 drives a rearwardly extending transmission shaft 11 which is coupled to a worm shaft 12 mounted in bearings 13, 14 in a rear part 15 of the chassis structure 1 by means of a coupling sleeve 16 engaging splined portions of the respective shafts. A worm gear 17 on the shaft 12 engages a worm gear wheel 18 rotatably mounted on an inner end portion 19 of a rear axle driving shaft 20, an outer end portion 21 of which is adapted for the mounting of a withdrawable endless track driving sprocket. The axle 20 is carried in bearings 22, 23 and is driven from the worm gear wheel 18 through dog clutch means 24 including a member 25 withdrawable against the action of a spring 26 by means of an actuating arm 27 mounted on an operating rod 28.

As shown, the rear axle assembly may be housed in a compartment 29 separated from the main portion 30 of the hollow chassis of structure 1 by a partition wall 31, a suitable oil seal 32 being provided so that the worm and worm wheel drive may operate in oil, suitable oil-sealing means 33 also being provided at the outer end of the rear axle assembly. The operating rods 28 are aligned, as shown, so as to be operable by means such as a cam 34 so that drive to both axles may be engaged or disengaged simultaneously. The clutch means enables the rear axles to be freed from the driving motors when required as, for instance, when the machine is to be towed by another vehicle.

As shown in Fig. 6, the control valve unit 10 for the two motors 8 may comprise a double valve structure including two compressed air supply chambers 35, 36 spaced apart by a compressed air inlet chamber 37. Each supply chamber 35, 36 is provided with two outlets for connection to the pipes 9, as shown in Fig. 1, and has two suitably disposed ports in an inner wall 38, each port, such as the port 39, as shown, communicating with one of said outlets. The ports 39 of each supply chamber 35, 36 are controlled by a valve rotor member 40 which, by means of a spring 41 conveniently disposed between the members 40, is pressed outwards into sealing engagement with seating faces of the supply chambers 35, 36. A control arm 42 for each supply chamber is disposed externally thereof and mounted on a shaft 43 which extends through a central boss 44 of the supply chamber and has an inner portion 45 engaging the respective valve rotor member 40 as by means of splines, keys or the like (not shown). When a valve rotor member is rotated so as to bring an opening 45′ therein into register with one of the ports 39, compressed air can pass from the inlet chamber 37 to the outlet from the supply chamber 35 or 36 associated with the respective port 39. Thus, by simple manipulation of the two control arms 42, the tracks 2 can be selectively driven forwards or backwards as required for moving the machine forwards or backwards or for steering.

An inlet 46 to the inlet chamber 37 is connected by means of a pipe 47 (Fig. 1) to a similar inlet chamber of the control valve 4 for the shovel bucket device and thence through a pipe 48 to a compressed air input fitting 49.

It will be understood that the invention is not limited to the particular embodiment hereinbefore described. For example, for use with electricity, the reversible motors would be electric motors and the control means would embody suitable switches. Furthermore, the reduction gearing may be of any other suitable form and the chassis structure may include a superstructure adapted to provide a base unit or platform for the mounting of various apparatus as required.

What I claim is:

A mobile machine of the kind having a chassis structure mounted on selectively drivable ground-engaging units, wherein said chassis structure is of hollow formation and the rear portion thereof forms a single transmission housing, two independent power reduction gear units in the transmission housing, one on each side of the center line thereof, each of said reduction gear units including a laterally extending driving axle, a gear secured to the inner end of said axle, and an endless track driving sprocket secured to the outer end of said axle, a pair of reversible fluid pressure actuated motors mounted at the forward end of said chassis, power transmission means extending rearwardly from each of the motors to the reduction gearing in the transmission housing, and control means for selective operation of each of said motors.

References Cited in the file of this patent

UNITED STATES PATENTS

| | | |
|---|---|---|
| 1,490,056 | Wostenberg | Apr. 8, 1924 |
| 2,046,517 | Jones | July 7, 1936 |
| 2,268,601 | Knox | Jan. 6, 1942 |
| 2,381,109 | Cartlidge | Aug. 7, 1945 |
| 2,446,242 | Orshansky | Aug. 3, 1948 |
| 2,507,548 | Sherwood | May 16, 1950 |
| 2,678,105 | Peterson | May 11, 1954 |

FOREIGN PATENTS

| | | |
|---|---|---|
| 611 | Great Britain | 1903 |